June 6, 1961  A. A. REITER  2,987,132
STEERING APPARATUS FOR AUTOMOTIVE VEHICLES
Filed Aug. 5, 1958  3 Sheets—Sheet 1
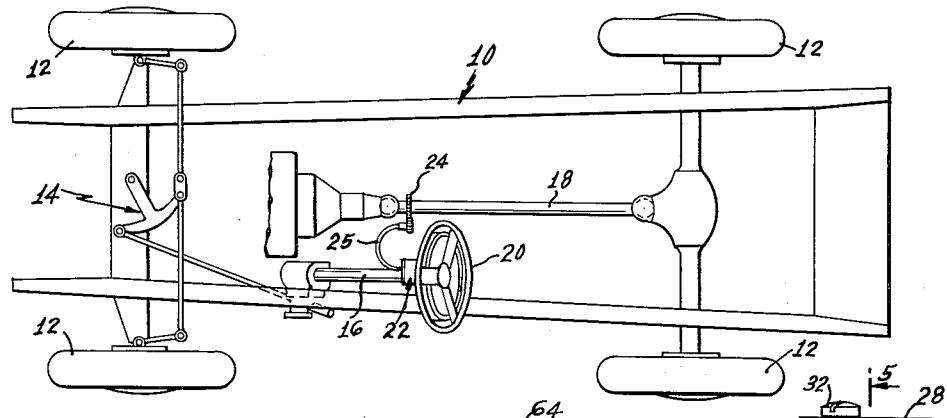
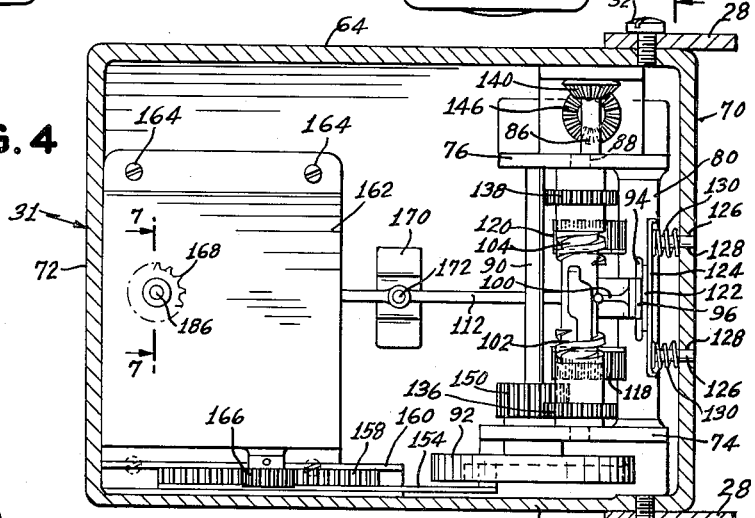
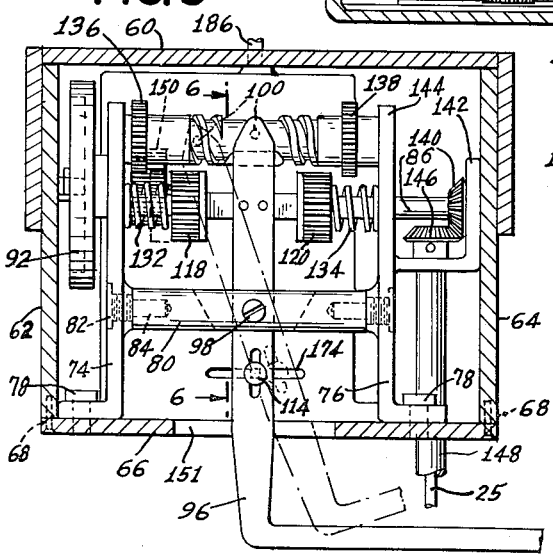
INVENTOR.
Adrian Aaron Reiter
BY
ATTORNEYS June 6, 1961 A. A. REITER 2,987,132
STEERING APPARATUS FOR AUTOMOTIVE VEHICLES
Filed Aug. 5, 1958 3 Sheets-Sheet 2
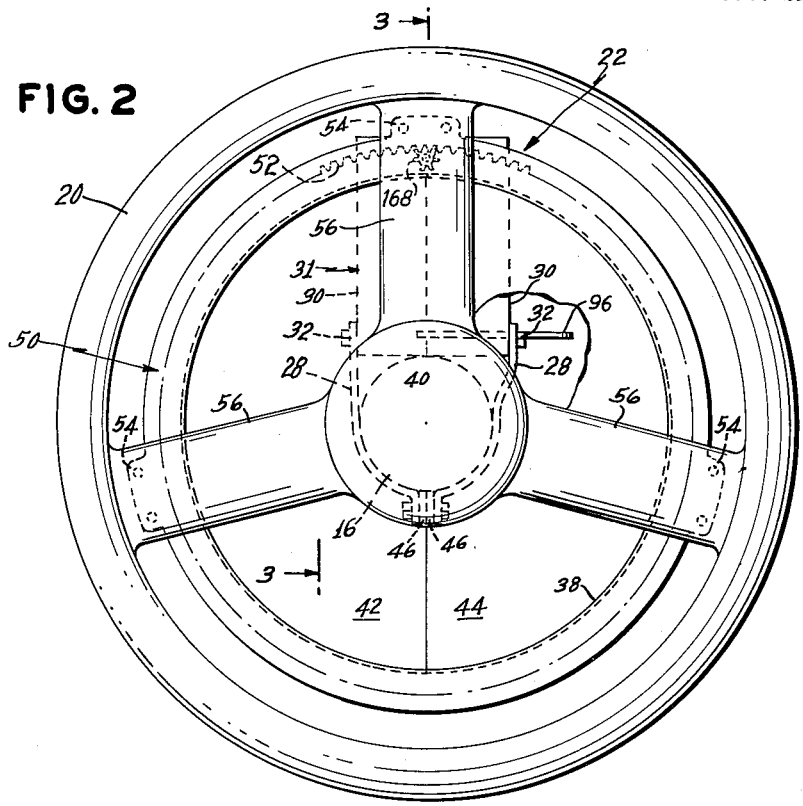
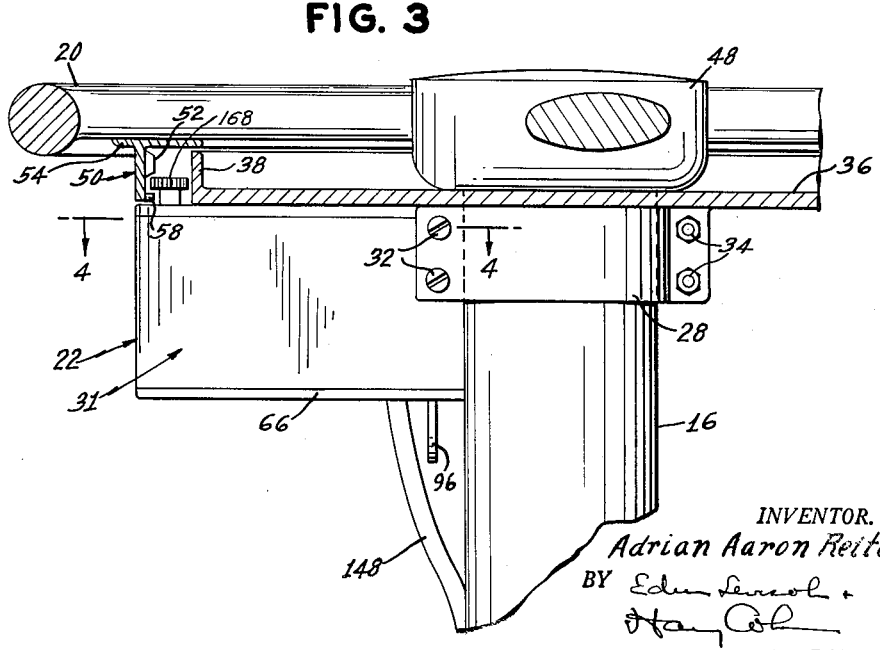
INVENTOR.
*Adrian Aaron Reiter*
BY
ATTORNEYS

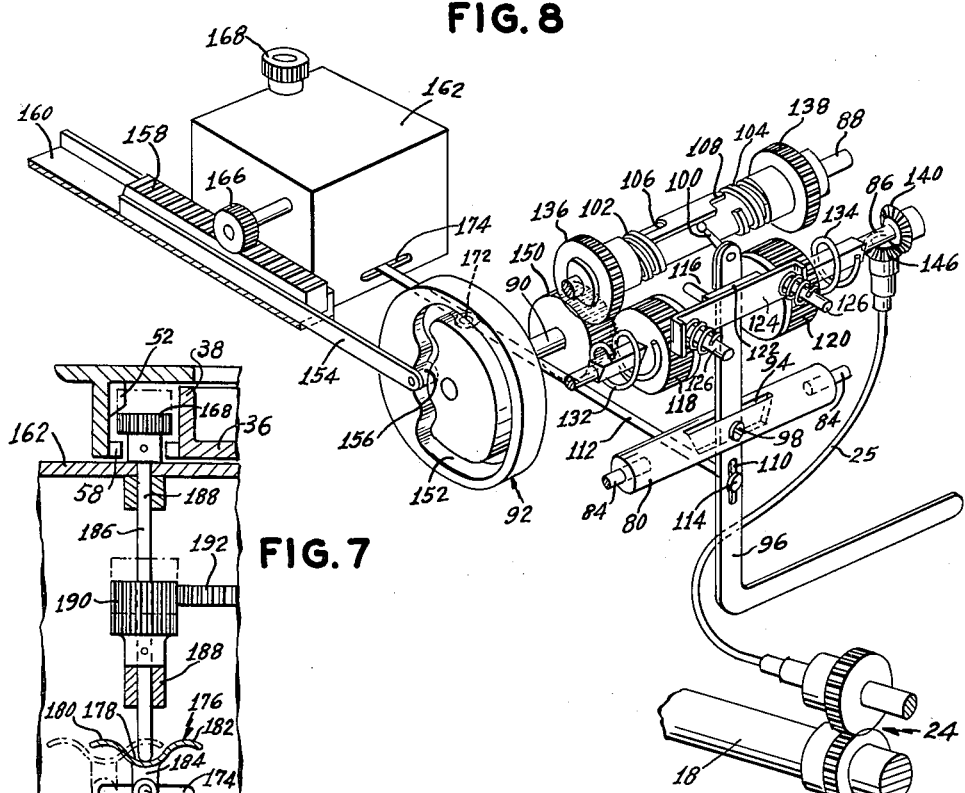
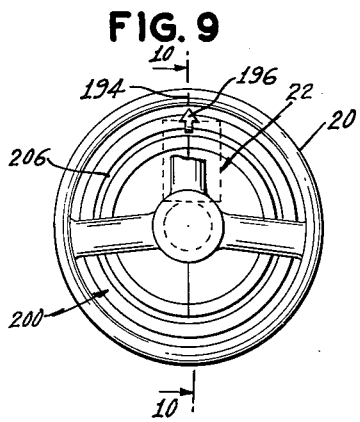
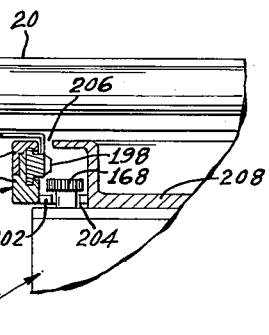

United States Patent Office 2,987,132
Patented June 6, 1961

2,987,132
STEERING APPARATUS FOR AUTOMOTIVE VEHICLES
Adrian Aaron Reiter, 35–44 75th St., Jackson Heights, N.Y.
Filed Aug. 5, 1958, Ser. No. 753,237
3 Claims. (Cl. 180—1)

This invention relates to automotive vehicles. More particularly, this invention relates to steering apparatus for automotive vehicles.

Steering of an automotive vehicle along a particular path, as is required during parking operations of the vehicle, requires considerable skill and judgment on the part of the operator of the vehicle. Slight errors in movements of the steering wheel of the vehicle will often misposition the vehicle from a correctly steered path resulting in improper parking of the vehicle.

One of the objects of this invention is to provide apparatus for steering a vehicle along a predetermined path.

Another object of the invention is to provide apparatus to indicate steering positions for a vehicle for the steering of the vehicle along a predetermined path.

A further object of the invention is to provide apparatus for automatic steering of the vehicle during parking operations thereof.

A still further object of the invention is to provide apparatus for indicating the proper positions of a steering wheel for a vehicle during parking operations of said vehicle.

The above and other objects, features and advantages of this invention will be fully understood from the following description considered in connection with the accompanying illustrative drawings of the presently preferred embodiment of this invention.

In the drawings:

FIG. 1 is a diagrammatic plan view of an automotive vehicle chassis embodying the present invention;

FIG. 2 is a plan view, with portions cut away, of a steering wheel for an automotive vehicle showing the steering apparatus embodying the invention installed thereon;

FIG. 3 is an elevational view, partly in section, taken on line 3—3 of FIG. 2;

FIG. 4 is a plan view, partly in section, taken on line 4—4 of Fig. 3;

FIG. 5 is an elevational view, partly in section, taken on line 5—5 of FIG. 4;

FIG. 6 is a fragmentary view, partly in section, taken on line 6—6 of Fig. 5;

FIG. 7 is a fragmentary view, partly in section, taken on line 7—7 of FIG. 4;

FIG. 8 is a diagrammatic perspective view of the steering apparatus embodying the present invention;

FIG. 9 is a diagrammatic plan view, with parts cut away, showing an embodiment of a modification of the invention; and FIG. 10 is a fragmentary elevational view, partly in section, taken on line 10—10 of FIG. 9.

Referring now to the drawings in detail, there is shown an automotive vehicle chassis 10, having wheels 12, a steering mechanism 14, a steering column 16 and a drive shaft 18, all of which are conventional parts of an automotive vehicle.

Pursuant to the invention there is provided beneath the steering wheel 20 of the vehicle a steering apparatus generally designated at 22, for the steering of an automotive vehicle along a predetermined path. Suitable gear means 24 may be provided on drive shaft 18 to operate steering apparatus 22 through flexible shafting 25 as will be fully described hereinafter.

Steering apparatus 22 is mounted to the steering column housing 16 of the vehicle by strap members 28, one end of each of strap members 28 being fastened to the sides 30 of the housing 31 of the steering apparatus 22 by screws 32. The opposite ends of strap members 28 are fastened to each other by suitable bolt and nut assemblies 34. It will be understood that the strap members 28 will engage the steering column housing 16 with enough force to prevent the steering apparatus 22 from sliding down along the steering column. If desired, the steering column housing 16 may be tapped for receiving screws to fasten strap members 28 to the column. Resting on the upper surface of housing 31 for the steering apparatus 22 is a circular protective shield 36 having an upstanding flange 38 along its outer periphery. Protective shield 36 may be made in two sections, 42 and 44 respectively, for easy assembly about the steering column housing 16, a central hole 40 being provided in protective shield 36 for passage of steering column housing 16 therethrough. Depending from each of sections 42 and 44 of protective shield 36 is a lug member 46 which secures the protective shield 36 to strap members 28 by bolt and nut assemblies 34. Steering wheel 20 is fastened to the enlarged upper part 48 of steering column housing 16 in a well known manner. Mounted to the under surface of steering wheel 20 is a circular housing 50 having an internal circular follower gear 52 fixedly mounted therein. Gear 52 may be made integral with housing 50, if so desired, as is well known to those skilled in the art. Housing 50 has extending flange portions 54 equally spaced around its periphery to coincide with the spacing of the spokes 56 of steering wheel 20, housing 50 being fastened to spokes 56 by suitable means, such as screws. Extending around the lower peripheral edge of housing 50 is a protective flange 58 for preventing the possibility of a driver touching gear 52 during the operation of the vehicle. Upstanding flange 38 of protective shield 36 also helps to effectively enclose gear 52 to prevent a driver's fingers from engaging gear 52.

Housing 31 comprises essentially a top 60, sides 62 and 64, and a bottom 66, which may be suitably fastened to each of sides 62 and 64 by screws 68. Housing 31 also has a front wall 70 and a rear wall 72. Spaced inwardly from each of sides 62 and 64 are two L-shaped bracket members, 74 and 76 respectively, which are mounted to bottom 66 of housing 31 by suitable means such as screws 78. Spaced upwardly from bottom 66 is a shaft 80 supported at each of its ends by bracket members 74 and 76, respectively, for pivotal movement thereon. The pivot supports for shaft 80 comprise pins 82 which screw into each of brackets 74 and 76 and have extending bearing portions 84 which are received in holes at each of the ends of shaft 80.

Mounted above and slightly rearwardly of shaft 80 are three shafts, 86, 88 and 90 mounted for support and rotational movement in brackets 74 and 76. Suitably mounted to shaft 90, to be driven thereby, is a grooved cam 92, located between bracket 74 and side 62 of housing 31. Cam 92 comprises means providing a predetermined steering pattern for the steering of a vehicle along a predetermined path, as will be more clearly understood from the discussion ensuing hereinafter.

With particular reference to FIG. 8, shaft 80 has an elongated slot 94 for pivotally mounting therein an L-shaped lever 96, screw 98 providing the pivot shaft for lever 96. The upper end of lever 96 has a prong 100 extending therefrom for engagement with partial screw threads 102 and 104 and cams 106 and 108 on shaft 88. The purpose of this engagement will be fully discussed hereinafter. Toward the lower end of L-shaped lever 96 is a slot 110 in which one end of a rod 112 slides, rod 112 being provided at that end with an enlarged engaging head 114, which may be provided by a screw, if desired. Mounted near the upper end of lever 96 is a yoke 116 for shifting gears 118 and 120 on shaft 86. Shaft 86 may have a square cross sectional area in the vicinity of gears 118 and 120 so that these gears may rotate with the rotation of shaft 86. Mounted to the forward surface of lever 96, near its upper end is a bearing plate 122 which engages a plate 124 to which pins 126 are mounted. Pins 126 slide in holes 128 in the front 70 of housing 31, springs 130 being provided about each of pins 126 to bias plate 124 against bearing plate 122 of lever 96, thereby biasing lever 96 into engagement with the partial screw threads and cams on shaft 88, as may be best seen in FIG. 6.

Compression springs 132 and 134 are provided on shaft 86 for biasing gears 118 and 120 toward each other and out of engagement with gears 136 and 138, respectively, which are fixedly mounted to shaft 88. Compression spring 132 is mounted between bracket 74 and gear 118 while compression spring 134 is mounted between bracket 76 and gear 120, as may be clearly seen in FIG. 5. Fixedly mounted at one extreme end of shaft 86 is a bevel gear 140 which is suitably supported by L-shaped bracket 142 which is attached to the upstanding leg 144 of L-shaped bracket 76. Bracket 142 may be attached to side 64 of housing 31, if so desired. Meshing with bevel gear 140 is another bevel gear 146, which is also supported by bracket 142. Bevel gear 146 is suitably fastened to flexible shafting 25 to be driven thereby, a protective sheath 148 being provided for flexible shafting 25. Shafting 25 projects up through a hole (not shown) in bottom 66 of housing 31. Thus it will be seen that shaft 86 comprises a power input shaft for the operation of the steering means or cam 92. It will also be noted that power for flexible shafting 25 is derived from the drive shaft 18 of the vehicle so that the rotation of shaft 86 will always be synchronized with the rotation of the drive shaft 18 of the vehicle and the wheels 12 of the vehicle. It will also be appreciated that power for flexible shafting 25 may be taken from other sources besides the drive shaft 18 of the vehicle as long as the rotation of flexible shafting 25, and consequently the rotation of input shaft 86 is synchronized with the rotation and movement of the wheels of the vehicle. It will be obvious to those skilled in the art that other driving means besides flexible shafting may be provided for input shaft 86. For example, a solid shaft may be provided, with universal joints as needed, between drive shaft 18 and input shaft 86. Mounted to shaft 90 and meshing with gear 136 is another gear 150 which is considerably wider than gear 136 to enable gear 118 to mesh therewith, upon actuation by lever 96, it being understood that gear 136 is always in mesh with gear 150.

Cam 92 has a grooved cam surface 152 therein, the cam surfaces providing a steering pattern for the steering of a vehicle along a preterminned path as will be more fully understood hereinafter. A follower rod 154 having a roller 156, rotatably mounted thereto, is adapted to ride in the cam surfaces 152 of grooved cam 92. Attached to follower rod 154 is a rack gear 158 which moves in response to the steering pattern provided on cam surfaces 152. Rack gear 158 is supported, for sliding movement thereon, on a slide 160 which is mounted to one side of a gear box 162. Gear box 162 is fastened by suitable means, such as screws 164, to the bottom 66 of housing 31. An input gear 166 and an output gear 168 is provided extending from gear box 162, it being understood that gear box 162 houses a reduction gear train which is not shown. Input gear 166 is driven by rack gear 158 so that operation of gear 168 will be in response to and in accordance with the steering pattern provided on cam surfaces 152.

Gear 168 is adapted to engage follower gear 52 mounted to the steering wheel 20 of the vehicle upon actuation of lever 96. This is best seen in FIGS. 4 and 7. Mounted to the bottom 66 of housing 31 is a bracket 170 having a pivot pin 172 extending upwardly therefrom to provide a pivot for actuating rod 112, the rod being provided with a hole therethrough for mounting on the pivot pin 172. Actuating rod 112 enters gear box 162 through slot 174 in the front of the gear box. Mounted to the end of actuating rod 112, which is in the gear box 162, is a winged-shaped member 176 having an inner recess 178 and two outer raised portions, 180 and 182 respectively. Depending from winged-shaped member 176 is a lug 184 to which the end of actuating rod 112 is fixedly attached. Gear 168 is fixedly mounted to a rod 186 which is adapted for limited vertical up and down movement in bearing supports 188, the lower end of rod 186 being supported for vertical movement relative thereto, by winged-shaped member 176. Bearings 188 are suitably supported from the walls of gear box 162. Gear 190 is mounted on rod 186 and is driven by gear 192 which is only partially shown in FIG. 7, it being understood that gears 190 and 192 comprise part of a reduction gear train not shown. It will be apparent from the foregoing that gear 168 is raised to engage gear 52 on the steering wheel of the vehicle by moving lever 96 to the right or to the left so that rod 186 will be actuated to move upwardly when either raised portions 180 or 182 engage the lower end of rod 186. FIG. 7 indicates, in dotted lines, the engagement of raised portion 182 of member 176 with rod 186.

The operation of the steering apparatus is as follows: Power is delivered to input shaft 86 of the operating mechanism for cam 92, from drive shaft 18 through gears 24, flexible shafting 25, to gear 146 which drives gear 140 which is mounted on shaft 86. Thus shaft 86 is continually rotating with drive shaft 18 and its motion will always be synchronized with the wheels of the vehicle. In the neutral position shown of lever 96, in FIG. 8, gears 118 and 120 are both disengaged from their respective engaging gears 150 and 138. The horizontal leg of L-shaped lever 96, which comprises the handle portion of lever 96, is pushed rearwardly against the biasing action of spring 130 to disengage prong 100 from cam 106 or 108 and shaft 88. Lever 96 projects through slot 151 in the bottom 66 of housing 31. The handle of lever 96 is then moved either to the right or to the left, depending upon which direction it is desired to steer the vehicle, to engage either of the outer ends of screw threads 102 or 104 as shown in dotted lines in FIG. 5, wherein screw threads 102 are engaged. The gear train in gear box 162 is so arranged that movement of the handle portion of lever 96 to the right will cause gear 168 to rotate in a direction for steering of the vehicle in one direction along a predetermined path, toward the right, and moving of the handle portion of lever 96 to the left will cause gear 168 to rotate in an opposite direction for steering of the vehicle in an opposite direction along the same predetermined path, toward the left. This is particularly useful when it is desired to steer the vehicle either to the left or right to park the vehicle either on the left or right side of a road. It will be understood, from the ensuing discussion, that the position of lever 96 for engagement with the right screw threads 104 will steer the vehicle along a predetermined path for left hand steering, as for parking on the left side of a road. Upon engagement of lever 96 with screw threads 102, as shown in dotted lines in FIG. 5, the automatic steering operation for the vehicle is commenced. Engagement of lever 96 with threads 102 causes yoke 116 to engage and move gear 118 on square shaft 86 against spring 132 for engagement with gear 150 for operation of cam 92. The foregoing movement of lever 96 will shift winged-shaped member 176 so that raised portion 180 will engage the lower part of rod 186 causing engagement of gear 168 with gear 52 on the steering wheel of the vehicle. Follower rod 154 will be driven by cam 92 which will operate input gear 166 causing the output gear 168 to rotate in accordance with the predetermined steering pattern provided on cam surfaces 152 of cam 92. Accordingly, steering wheel 20 will be operated to turn the steering mechanism of the vehicle for steering of the vehicle along a predetermined path in accordance with the steering pattern provided on cam 92. During rotation of cam 92 and shaft 88, threads 102 will drive prong 100 toward cam surfaces 106 on shaft 88 and upon completion of one revolution of cam 92 cam surfaces 106 will engage prong 100 and drive it and lever 96 into the neutral position shown in FIG. 8, wherein gear 118 under the force of spring 132, will disengage gear 150 and the steering operation will cease. It will be understood that the steering operation should cease after the completion of one revolution of the cam 92 or else the steering of the vehicle will be repeated along the same predetermined path. During parking operations of the vehicle it is necessary that steering of the vehicle cease at the end of the parking cycle for the vehicle. If it is desired to park the vehicle on the opposite side of the road it is necessary that the vehicle be steered along a path opposite to the steered path for parking of the vehicle on the other side of the road. This is accomplished by reversing the rotation of cam 92 by engaging lever 96 with right screw threads 104. The right position of lever 96 causes cam 92 to rotate in one direction and the left position of lever 96 causes cam 92 to rotate in the opposition direction, while in the neutral position of lever 96, shown in FIG. 8, cam 92 does not rotate. Upon engagement, yoke 116 will move gear 120 against the force of spring 134 into engagement with gear 138 so that power will be delivered to cam 92 through gear 138, gear 136 and gear 150 wherein cam 92 will turn in a direction opposite from that previously described. Reversed direction of rotation of cam 92 will cause reversed movement of output gear 168 which will move steering wheel 20 of the vehicle in the opposite direction from that previously described. When lever 96 is moved for engagement with threads 104, winged-shaped member 176 will move into the position shown in dotted lines in FIG. 7 so that raised portion 182 will engage the lower part of rod 186 to raise gear 168 for engagement with gear 52 on the steering wheel of the vehicle. When lever 96 is in either the left or right engaged positions, gear 168 is engaged with gear 52, and when lever 96 is in the neutral position shown in FIG. 8, gear 168 is disengaged from gear 52. Similarly when cam 92 completes one complete revolution, threads 104 will move prong 100 of lever 96 into engagement with cam surfaces 108 wherein the lever will again be returned to neutral under the action of the cam surface against prong 100. Gear 120 will then be moved out of engagement with gear 138 under the force of spring 134 wherein rotation of cam 92 will stop. It will be noted that when lever 96 is returned to neutral position gear 168 will disengage itself from gear 52 as winged-shaped member 176 returns to its neutral position wherein the lower part of rod 186 will rest in inner recess 178.

It will be understood that the steering pattern provided on the cam surfaces 152 of cam 92 will vary depending upon the characteristics of the vehicle to be steered. In addition, for proper positioning of the vehicle at the commencement of the parking operation, which is desirable for proper parking of the vehicle, means may be provided to insure such proper positioning.

In FIGS. 9 and 10 there is shown a modified embodiment of the present invention wherein steering of the vehicle is accomplished by the driver in the usual manner and steering indicator means are provided to indicate the steering pattern necessary to steer the vehicle along a predetermined path. In this modification of the invention the driver follows an indicator to steer the vehicle along a predetermined path. FIG. 9 shows a steering wheel 20 having an indicator mark 194 on the upper surface of the hand grip of the steering wheel. An indicating arrow 196 is provided for movement in accordance with a predetermined steering pattern for a predetermined path for the vehicle to follow. Indicating arrow 196 is mounted to a circular internal follower gear 198 which is mounted for rotational movement in a gear housing 200. Gear housing 200 may be suitably mounted to the steering column 16 of the vehicle by means similar to the mounting of protective shield 36 to strap members 28. It will be understood that steering apparatus 22 is mounted to steering column 16 by strap members 28, similar to the embodiment of the invention, shown in FIG. 3, the steering apparatus 22 being lowered slightly to provide clearance for movement of indicating arrow 196 beneath the undersurface of steering wheel 20. Gear housing 200 will be provided with suitable bearing surfaces (not shown) to permit rotation of gear 198 therein and may be made in an upper section 200a and a lower section 200b, for easy assembly of the gear in the housing, as will be well known to those skilled in the art. A suitable protective flange 202 is provided in the circular opening 204 in the undersurface of the housing 200 through which driver gear 168 protrudes for meshing with gear 198 upon actuation of lever 96 in the exact same manner as heretofore described. A circular groove 206 is provided in the upper surface of housing 200 through which arrow 196 projects for rotational movement with gear 198. No protective shield need be provided for the embodiment shown in FIGS. 9 and 10, as was provided by shield 36 in the other embodiment of the invention, since the inner part 208 of housing 200, which partially rests on the top of housing 31 of steering apparatus 22, encloses the open groove 206, thereby providing the necessary protection against gear 198. It will be understood that neither gear 198 nor gear housing 200 is connected to steering wheel contrary to what is shown in the embodiment disclosed in FIG. 3, and that gear 198 is operated by steering apparatus 22 in the same manner as gear 52 is operated by steering apparatus 22.

The modified embodiment of the invention, shown in FIGS. 9 and 10, operates in the following manner: Lever 96 is actuated to engage either threads 102 or 104, as may be desired, causing gear 168 to engage gear 198 and simultaneously causing either gears 118 or 120 to engage either gear 150 or 138, respectively, to operate cam 92 wherein gear 168 will rotate in response to the steering pattern recorded on cam 92. Accordingly, indicating arrow 196 will be operated and moved in accordance with the predetermined steering pattern recorded on cam 92 to move the vehicle along a predetermined path. As the indicating arrow moves the driver of the vehicle turns steering wheel 20 so that indicator mark 194 on the steering wheel will always coincide with the positions of indicating arrow 196 and the vehicle will be steered along a predetermined path as provided by the steering pattern on cam 92. If desired, power for driving the indicator 196 may be taken from the speedometer cable of the vehicle since very little power is needed to drive the indicating arrow 196 as compared to driving the steering mechanism of the vehicle.

For initial starting, the indicating arrow 196 and indicator mark 194 should be aligned. This may easily be done by moving arrow 196 by hand, since in the neutral position of lever 96, gear 198 is disengaged from driver gear 168, and is therefore free to rotate.

It will be apparent that the invention is applicable to vehicles with power steering as well as those vehicles without power steering.

While I have shown and described the presently preferred embodiment of the invention, it will be understood that the invention may be embodied otherwise than as herein specifically illustrated or described and that in the illustrated embodiment certain changes in the details of construction and in the form and arrangement of parts may be made without departing from the underlying idea or principle of the invention. Accordingly, I do not wish to be limited to the precise construction shown or described herein, except as may be required by the scope of the appended claims.

Having thus described my invention, what I claim and desire to secure by Letters Patent is:

1. Apparatus for use in a vehicle having a conventional steering wheel positioned in front of the vehicle's driver and adapted to be manually operated by said driver, said apparatus being for the purpose of steering said vehicle for movement in a predetermined path, comprising cam means having cam surfaces thereon providing a steering pattern for said vehicle in accordance with said predetermined path of movement of said vehicle, means for operating said cam means in synchronized relation to the operation of the wheels of said vehicle, said cam operating means having means for reversing the direction of rotation of said cam means for reversed steering of said vehicle, means for directly controlling the movements of said steering wheel for said vehicle, and follower means for said cam means for operating said control means for said vehicle steering means in response to said steering pattern for steering of said vehicle along said predetermined path directly through the steering wheel of said vehicle.

2. Apparatus for use in automatic steering of a vehicle during parking thereof, comprising cam means having a steering path provided on cam surfaces thereof, means for operating said cam means periodically to permit said cam means to make one complete revolution upon actuation thereof for completing a parking cycle for said vehicle comprising an input shaft having power means attached thereto for operation of said input shaft in unison with the movement of said vehicle, an output shaft connected to said cam means for operating said cam means, means for selectively connecting said input shaft to said output shaft, means operatively connected to said last mentioned means responsive to the position of said cam means for actuating said last mentioned means for disconnecting said input shaft from said output shaft upon completion of a parking cycle for said vehicle, cam follower means for said cam surfaces, steering means for said vehicle, means responsive to movement of said cam follower means for controlling the movement of said steering means for said vehicle, and means selectively interconnecting said controlling means for said steering means to said steering means for actuating said steering means according to said steering pattern for steering said vehicle during parking operations thereof, said means for connecting said input shaft to said output shaft having means for reversing the direction of operation of said cam means to permit reversed operation of said steering means for parking of said vehicle on either side of a road.

3. Apparatus for use in steering a vehicle during parking thereof, comprising means providing a predetermined steering pattern in accordance with the predetermined path followed by said vehicle during parking thereof, a steering mechanism for said vehicle, means responsive to said steering pattern means for operating said steering mechanism for said vehicle in accordance with said steering pattern, said operating means for said steering mechanism including gear means, means for operating said steering pattern means in synchronized relation to the movement of said vehicle, said last mentioned means including means for reversing the direction of movement of said steering pattern means for reversed steering of said vehicle to permit parking of said vehicle on either side of a road, and means selectively interconnecting said operating means for said steering mechanism to said steering mechanism for operating said steering mechanism for steering said vehicle along said predetermined path during parking operations thereof, said last mentioned means including first gear means fixedly mounted on the steering wheel of said vehicle and also including means responsive to the position of said reversing means for selective engagement of the gear means of said operating means for said steering mechanism with the gear means mounted on the steering wheel, for actuating said steering wheel for steering said vehicle during parking operations thereof.

References Cited in the file of this patent

UNITED STATES PATENTS

| | | |
|---|---|---|
| 1,570,547 | Avera | Jan. 19, 1926 |
| 1,905,717 | Jackson | Apr. 25, 1933 |
| 2,459,202 | Thorson | Jan. 18, 1949 |
| 2,492,531 | Lee | Dec. 27, 1949 |
| 2,736,015 | Gilvarry et al. | Feb. 21, 1956 |
| 2,906,355 | Hirsch | Sept. 29, 1959 |